Jan. 11, 1944. V. S. MAKAROFF 2,339,086
BOOSTER AND ECONOMIZING SYSTEM FOR AIR COMPRESSORS
Filed Aug. 16, 1941
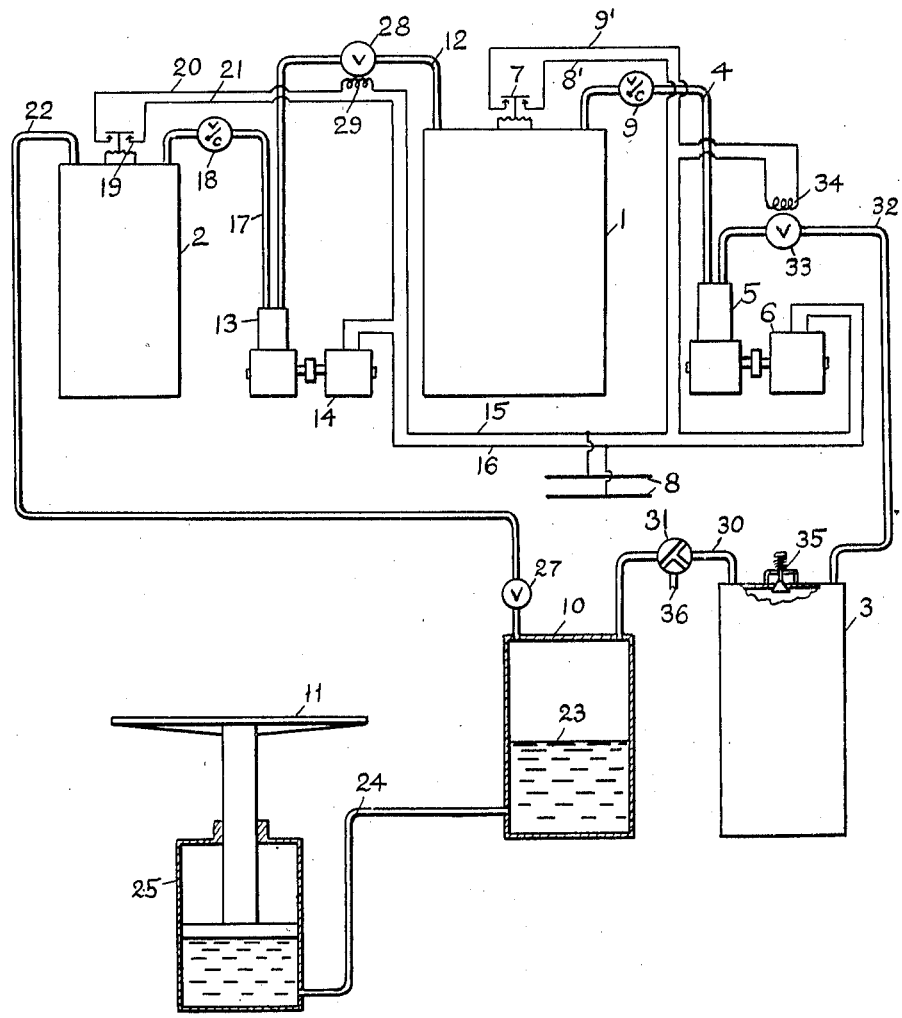
Vadim S. Makaroff
INVENTOR.
BY John P. Mironow
ATTORNEY Patented Jan. 11, 1944

2,339,086

UNITED STATES PATENT OFFICE 2,339,086

BOOSTER AND ECONOMIZING SYSTEM
FOR AIR COMPRESSORS

Vadim S. Makaroff, New York, N. Y.

Application August 16, 1941, Serial No. 407,104

1 Claim. (Cl. 60—51)

My invention relates to boosting and economizing systems for air compressors and has particular reference to systems for boosting and conserving the compressed air used in air and hydraulic lifting devices.

Garages, service and filling stations usually require a relatively small single stage air compressor for pumping up automobile and truck tires and for other purposes, such as forcing grease under pressure into different parts of automobile chassis. Such compressors, however, are insufficient to supply compressed air for high-powered air lifts and for moving a liquid in hydraulic lifts when the latter are installed for servicing automotive vehicles. Much higher pressure requirements (usually about 175 pounds per square inch) necessitate installation of an expensive two stage compressor of considerably greater power.

I have found, however, that the existing installations of air compressors can be adapted for use with hydraulic and other lifts requiring high air pressure by providing additional small and inexpensive compressors, recompressing the air, delivered by the old compressor, to a higher pressure. Considerable economy is thus effected in the installation of the system and also in its operation, since the old compressor can be used for all ordinary purposes, the booster being connected only when the lift is used.

An additional economy can be obtained with my system by providing a storage tank for the exhaust air from the lift. In ordinary installations, in order to lower a lift, the compressed air is exhausted into the atmosphere and is lost. In my system I exhaust the air from the lift into a special storage or economizer tank where it remains at a pressure, considerably higher than atmospheric but sufficiently low to permit lowering the lift.

The standard air compressor draws the air from the storage tank, compressing the air to a higher pressure, to be further compressed by the booster compressor. Considerable economy is thus effected in the power consumption.

My invention is more fully described in the accompanying specification and drawing, the single figure of which represents a diagrammatic view of a compressed air system in accordance with my invention.

My compressed air booster and economizing system consists of tanks 1, 2 and 3 for compressed air. The tank 1 is connected by a pipe 4 with the exhaust of an air compressor 5, operated by an electric motor 6. The compressor may be of a standard type, used in garages and service stations for pumping tires, etc., and capable of raising air pressure to about 100 lbs. per square inch. An automatic electric switch 7 is provided on the tank 1, operated by a flexible diaphragm and connected by leads 8' and 9' with the motor 6 and a source of electric current 8. The diaphragm is so adjusted that the switch disconnects the motor when pressure rises to about 90 lbs. A one-way valve 9 may be provided in the pipe 4 to prevent leakage of air through the compressor when the latter is not operating.

The tank 1, instead of being directly connected to an accumulator 10 of a hydraulic lift 11, is connected by a pipe 12 to a booster compressor 13 with an electric motor 14 connected by leads 15 and 16 with the source of current 8. The booster compressor may be of relatively low power but capable of compressing the air to a higher pressure as required for the operation of the hydraulic lift, usually about 175 lbs. per square inch. The exhaust of the compressor 13 is connected by a pipe 17 with the high pressure tank 2.

A one-way valve 18 may be provided in the pipe 17 to prevent leakage of the compressed air through the compressor 13.

A diaphragm-operated switch 19 is provided for the tank 2, connected by leads 20, 21 with the lead 15 of the motor 14 for stopping the latter when the pressure reaches a predetermined value such as 175 lbs. per sq. inch.

The tank 2 is connected by a pipe 22 with the air space in the accumulator 10 above the liquid 23 which is forced through a pipe 24 into a cylinder 25 of the hydraulic lift 11. A manually operable valve 27 is placed in the air supply pipe 22.

A valve 28 may be provided in the pipe 12, operated by a magnet 29 connected in series with the circuit of the motor 14. The valve is normally closed, preventing leakage from the tank 1 through the compressor 13, and is opened when the compressor is operating. This valve may be omitted, however, if the compressor is of a sealed type, such as is used, for instance, with electric refrigerators.

The cylinder 25 is connected by a pipe 30 with the economizer tank 3 through a three-way valve 31. By turning the valve to the exhaust position and closing the valve 27, the air from the accumulator is exhausted into the tank 3 where it is expanded to a relatively low pressure such as 50 lbs. per sq. inch, which will be sufficiently low to permit lowering of the lift. The tank 3 is connected by a pipe 32 with the compressor 5 through its intake. Power consumption of the compressor 5 is thereby greatly reduced since it will be required to compress the air from 50 to 100 lbs. instead of from atmospheric pressure to 100.

A valve 33 is placed in the pipe 32 operated by a magnet 34 connected in series with the motor 6, so that the valve is opened only when the motor is operating. A relief valve 35 is provided on top of the tank 3 for admitting atmospheric air into the tank when pressure in the tank falls and vacuum begins to form.

The valve 31, if desired, may be turned into a position for exhausting the air from the lift into the atmosphere through a pipe 36.

It should be noted that the tank 3 may be omitted in a simplified installation, when the efficiency is of lesser consideration than the first cost.

With my system it is possible to adapt any standard or ordinary compressed air installation for operating a high pressure hydraulic lift or other power device, by merely adding an inexpensive equipment in the form of a small booster-compressor and a relatively small high pressure tank. A material saving in the installation expenses is thereby effected. Power consumption is also reduced by providing the economizer tank.

It is understood that my boosting and economizing system for air compressors may be further modified without departing from the spirit of my invention as set forth in the appended claim.

I claim as my invention:

A booster air compressor system comprising a hydraulic power device having a space for a liquid and a space for air; an accumulator for the liquid having air space above the liquid; an uninterrupted pipe connecting the liquid space in the power device with the liquid space in the accumulator; a low pressure exhaust air storage tank; an air pipe connecting the air space in the accumulator with the air storage tank; a three-way valve in the air pipe for connecting the accumulator with the tank or with the outside air; a relatively large intermediate high pressure tank; an air pump; a valved pipe connecting the intake of the pump with the exhaust tank, the pump exhaust being connected with the intermediate tank; means on the exhaust tank to connect the tank with the atmosphere when the pressure in the tank falls below atmospheric; a relatively small high pressure tank; a valved pipe between the small high pressure tank and the power device; a high pressure pump having its intake connected with the large high pressure tank and its exhaust connected with the small high pressure tank; a valve in the pipe between the first mentioned pump and the exhaust tank; and means to control the valve by the pressure in the intermediate tank.

VADIM S. MAKAROFF.